(12) United States Patent
Casper

(10) Patent No.: US 6,920,183 B2
(45) Date of Patent: Jul. 19, 2005

(54) CROSSTALK EQUALIZATION FOR INPUT-OUTPUT DRIVER CIRCUITS

(75) Inventor: Bryan K. Casper, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 530 days.

(21) Appl. No.: 09/965,038

(22) Filed: Sep. 26, 2001

(65) Prior Publication Data

US 2003/0058803 A1 Mar. 27, 2003

(51) Int. Cl.$^7$ .............................................. H04L 25/00
(52) U.S. Cl. ................... 375/257; 375/288; 341/51; 341/52; 341/102; 341/106; 379/353; 379/414; 379/417
(58) Field of Search ............................ 375/216, 246, 375/253, 257–259, 288, 377; 301/102, 103, 106, 52, 51, 15; 379/353, 90, 398, 299, 414, 417

(56) References Cited

U.S. PATENT DOCUMENTS

| | | | |
|---|---|---|---|
| 5,160,929 A | * | 11/1992 | Costello ........................ 341/57 |
| 5,412,689 A | * | 5/1995 | Chan et al. .................. 375/288 |
| 6,215,821 B1 | | 4/2001 | Chen |
| 6,226,330 B1 | * | 5/2001 | Mansur ........................ 375/257 |
| 6,504,875 B2 | * | 1/2003 | Perino et al. ................ 375/257 |

FOREIGN PATENT DOCUMENTS

| | | |
|---|---|---|
| EP | 0 612 175 A2 | 8/1994 |
| EP | 0 714 191 A2 | 5/1996 |
| EP | 1 133 123 A2 | 9/2001 |

OTHER PUBLICATIONS

Jim Tavacoli, Accelerant Networks, Accelerant Unveils Ultra–High Speed Backplane Communication Transceiver, 3 pgs.

Jared L. Zerbe, et al.,ISSCC 2001/Session 4/High–Speed Digital Interfaces/4.5. p. 52–53, 376–377, ibid p. 66–67, 432–433.

* cited by examiner

*Primary Examiner*—Dac V. Ha
(74) *Attorney, Agent, or Firm*—Blakely, Sokoloff, Taylor & Zafman LLP

(57) ABSTRACT

Embodiments of the present invention mitigate crosstalk by equalizing transmit signals in a data dependent fashion.

9 Claims, 4 Drawing Sheets

CROSSTALK EQUALIZATION FOR INPUT-OUTPUT DRIVER CIRCUITS

FIELD

Embodiments of the present invention relate to circuits, and more particularly, to crosstalk equalization for driver circuits.

BACKGROUND

Capacitive and inductive coupling between transmission lines may lead to electromagnetic signals propagating in one transmission line adversely affecting electromagnetic signals propagating in another transmission line. This is often referred to as crosstalk. Transmission lines are common in computer systems, where a chip (die) may communicate with another chip via transmission lines. For example, part of a computer system is shown in FIG. 1, where CPU (Central Processing Unit) 102 communicates with chipset 104 via front side bus 106. Chipset 104 comprises a memory controller to communicate with memory via memory bus 110, and has a port for communicating with graphics processor 112 via graphics bus 114. Chipset 104 also comprises a bridge for communicating to other peripherals, such as network interface controller 116, via system bus 118. The busses in FIG. 1 may considered transmission lines.

The crosstalk problem is illustrated in FIG. 2, where a pulse representing a logical "1" is transmitted by driver 202 on transmission line 204, and driver 206 indicates a logical "0" by not transmitting a signal on transmission line 208. (For simplicity, only one conductor for each transmission line is shown, but in practice there may be one or more planar conductors forming part of the transmission line structure.) The received pulses are depicted in FIG. 2, where pulse 210 depicts the received pulse on transmission line 204, pulse 212 depicts the received pulse on transmission line 208, and where $t_1$, $t_2$, and $t_3$ are three instances of time for which $t_1$ is the rise of pulse 210, $t_2$ is the midpoint of pulse 210, and $t_3$ is the fall of pulse 210. Pulse 212 results from crosstalk, and is approximately the derivative of pulse 210.

If pulses 210 and 212 are aligned as shown in FIG. 2, and sampling occurs at $t_2$, then received pulse 212 on transmission line 208 is correctly interpreted as a logical "0". However, there may be timing jitter so that received pulse 212 may not be sampled at time $t_2$, or there may be electrical length mismatch among transmissions lines 204 and 208 so that the received pulses are not aligned as indicated in FIG. 2. Consequently, pulse 212 may be sampled so that it is interpreted incorrectly as a logical "1".

A transmission line may take various physical forms, such as a stripline or a microstrip. A stripline may comprise a trace between two planar conductors, whereas a microstrip may comprise a trace adjacent to one planar conductor. Crosstalk may be less of a problem for a stripline than a microstrip. However, striplines are more costly than microstrips. Consequently, the problem of crosstalk may be a common problem in computer systems, especially as signaling rate increases.

DESCRIPTION OF EMBODIMENTS

Embodiments of the present invention mitigate the effects of crosstalk by equalizing the transmitted pulses in a data dependent fashion. This equalization involves a mapping between data symbols and signals transmitted on a set of transmission lines. This mapping may be performed in a number of ways, e.g., by a table look-up or a finite state machine.

Figure 1:
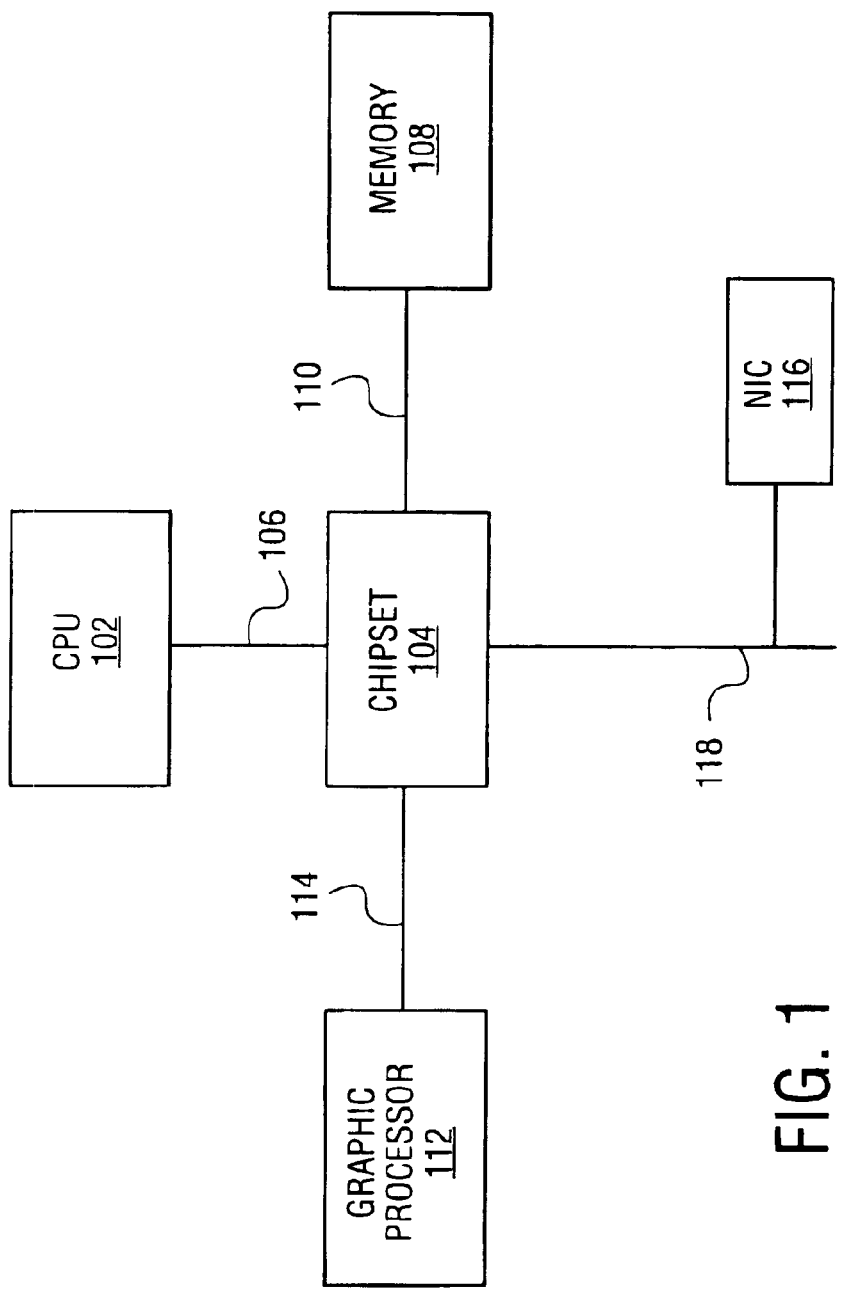
FIG. 1 is a high-level diagram of a computer system.
Figure 2:
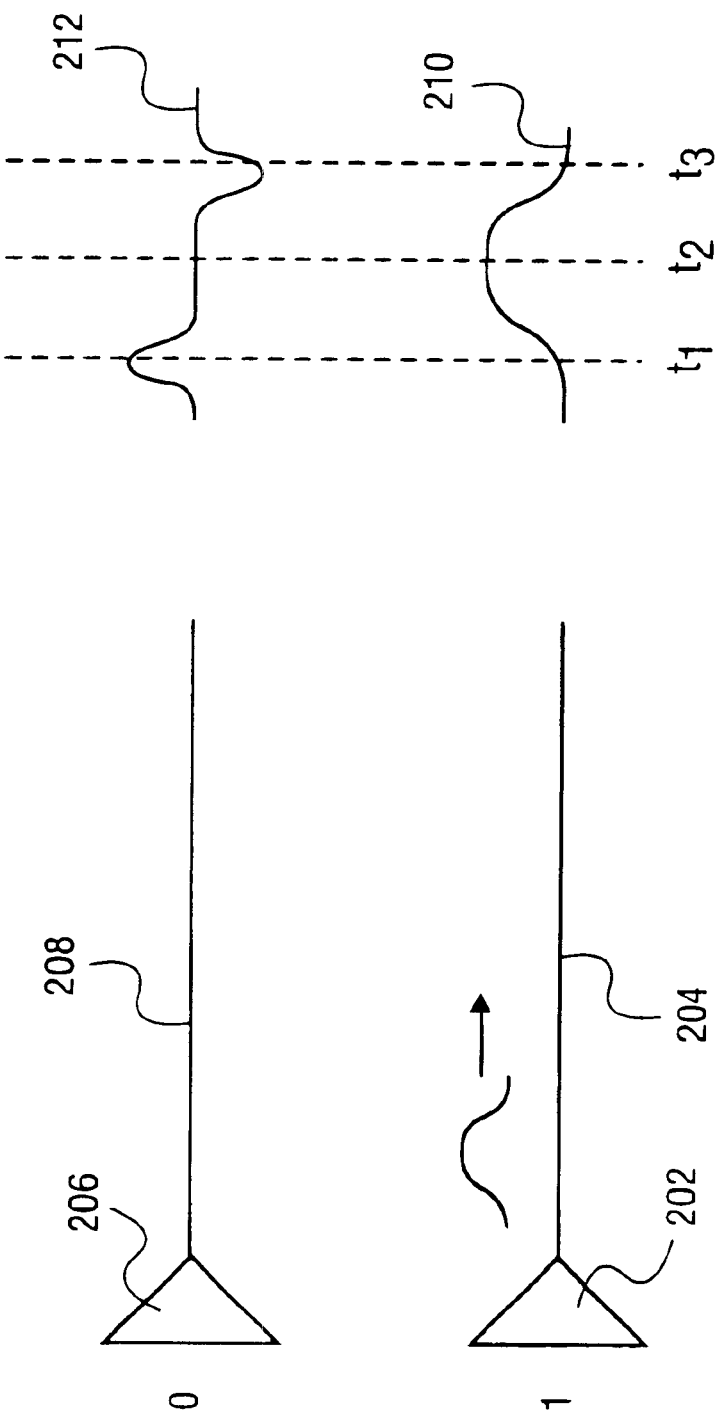
FIG. 2 depicts crosstalk in transmission lines.
Figure 3:
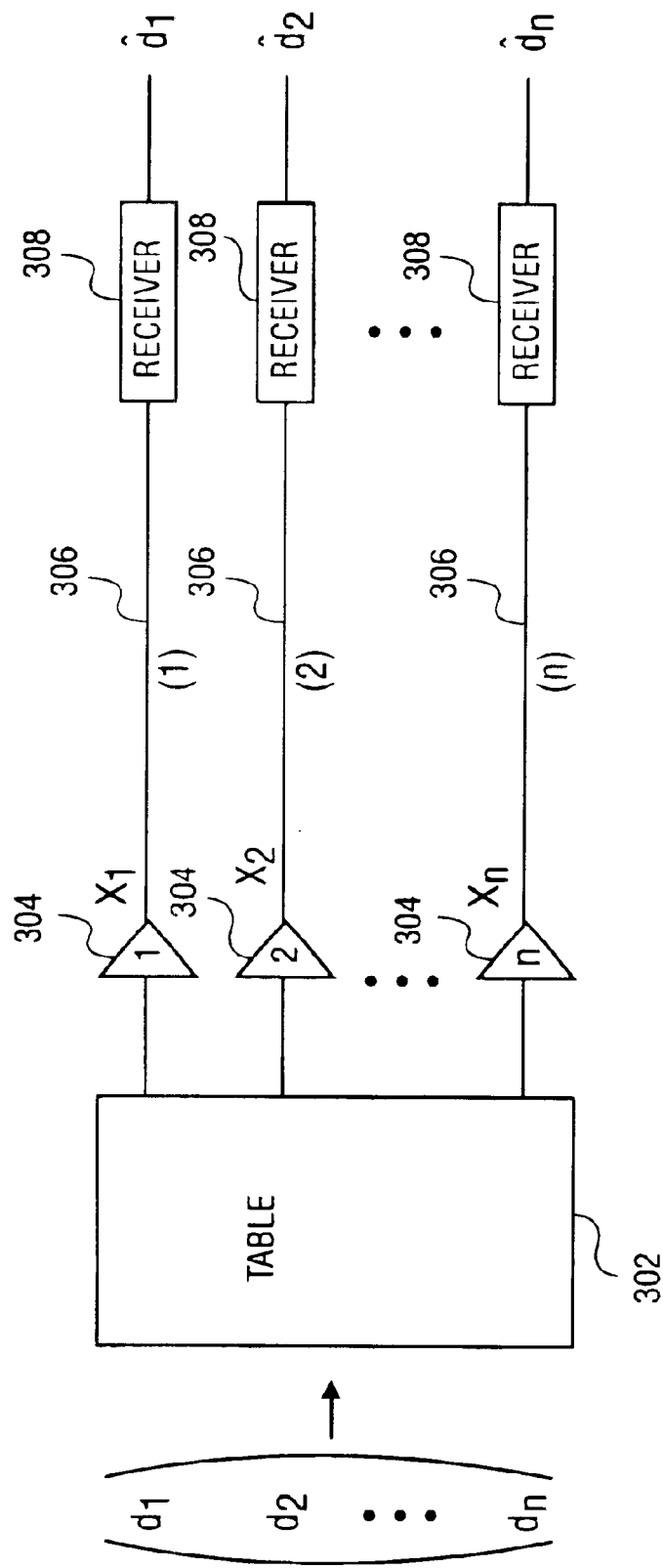
FIG. 3 is an embodiment for crosstalk equalization according to an embodiment of the present invention.

An embodiment employing a table look-up procedure is depicted in FIG. 3. It is desired to transmit a set of n data symbols $d_i$, i=1,2, ..., n over n transmission lines 306. The set of n data symbols $d_i$, i=1,2, ..., n is presented to table 302 as an address. If these data symbols are bits, which is the usual case, then the address space is 2. For each address, table 302 provides n words to n drivers 304, one word to each driver. These n words may not all be distinct. A word provided to a driver comprises a set of parameters that are mapped by the driver to a signal. In FIG. 3, these n signals are denoted as $x_i$, i=1,2, ..., n. Each of n receivers 308 makes a decision based upon a received signal on the transmission line to which it is connected so as to provide an estimate of a data symbol. The estimated data symbols are denoted by $\hat{d}_i$, i=1,2, ..., n.

The combination of table 302 and drivers may be viewed as mapping a set of data symbols $d_i$, i=1,2, ..., n to a set of transmit signals. This mapping is chosen such that the receivers provide the correct estimates $\hat{d}_i = d_i$ for all i in the ideal noiseless case. This mapping depends upon the transmission characteristics of the transmission lines, taking into account any capacitive and inductive coupling between the transmission lines, and also depends upon the type of receiver 308 chosen.

To provide an example for choosing a mapping, notation is first introduced. Suppose the receivers have been designed such that a received signal having the Fourier transform $D_i(f)$ is decoded into the estimate $\hat{d}_i = d_i$. For example, $D_i(f)$ may be Gaussian shaped for a logical "1" and zero for a logical "0", and the receiver may be an integrating receiver so that a logical "1" is declared if the magnitude of the integrated output is greater than some threshold and a logical "0" is declared otherwise. For later convenience, let D(f) denote the n dimensional column vector with components $[D(f)]_i = D_i(f)$, i=1, ..., n.

Let l(i) denote the $i^{th}$ transmission line. Denote the Fourier transform of the signal as it is transmitted by a driver on transmission line l(i) as $X_i(f)$, i=1,2, ..., n and denote the Fourier transform of the signal as it is received by a receiver on transmission line l(i) as $Y_i(f)$, i=1,2, ..., n. Let X(f) denote an n dimensional column vector with components $[X(f)]_i = X_i(f)$, i=1, ..., n and let Y(f) denote an n dimensional column vector with components $[Y(f)]_i = Y_i(f)$, i=1, ..., n.

Suppose the input-output relationship of the transmission lines is linear and time-invariant so that it may be accurately modeled as Y(f)=H(f)X(f), where H(f) is a full rank n by n matrix. Then the mapping whereby the set of data symbols $d_i$, i=1,2, ..., n is mapped into the n dimensional column vector of transmit signals having Fourier transform vector X(f) given by $X(f) = H(f)^{-1} D(f)$ provides the proper data-dependent equalization such that the receivers obtain the correct estimates of the transmitted data symbols.

Whether or not the set of transmission lines has a linear, time-invariant transfer function matrix H(f), the mapping from data symbols to transmitted signals may be obtained by analysis or measurement. The above model merely serves to show a method for providing the mapping. If the transfer function matrix H(f) is an accurate model, it may be found experimentally by transmitting impulses and measuring the frequency spectrum of the received signals. For example, the component $[H(f)]_{i,j}$ of the transfer function matrix is the Fourier transform of the impulse response of transmission line l(i) when an impulse is transmitted on transmission line l(j). Consequently, a spectrum analyzer applied to each receiving end of the transmission lines when an impulse is transmitted on transmission line l(i) provides the $j^{th}$ column of H(f).

In practice, the space of possible transmitted signals is finite, so that even if the set of transmission lines has the linear, time-invariant transfer function matrix H(f), only an approximation to $H(f)^{-1}D(f)$ is actually synthesized. This synthesis may be realized by fractionally-spaced (in the time domain) drivers having multiple voltage levels. One such embodiment of a fractionally-spaced, multi-level driver is given in FIG. 4.

Figure 4:
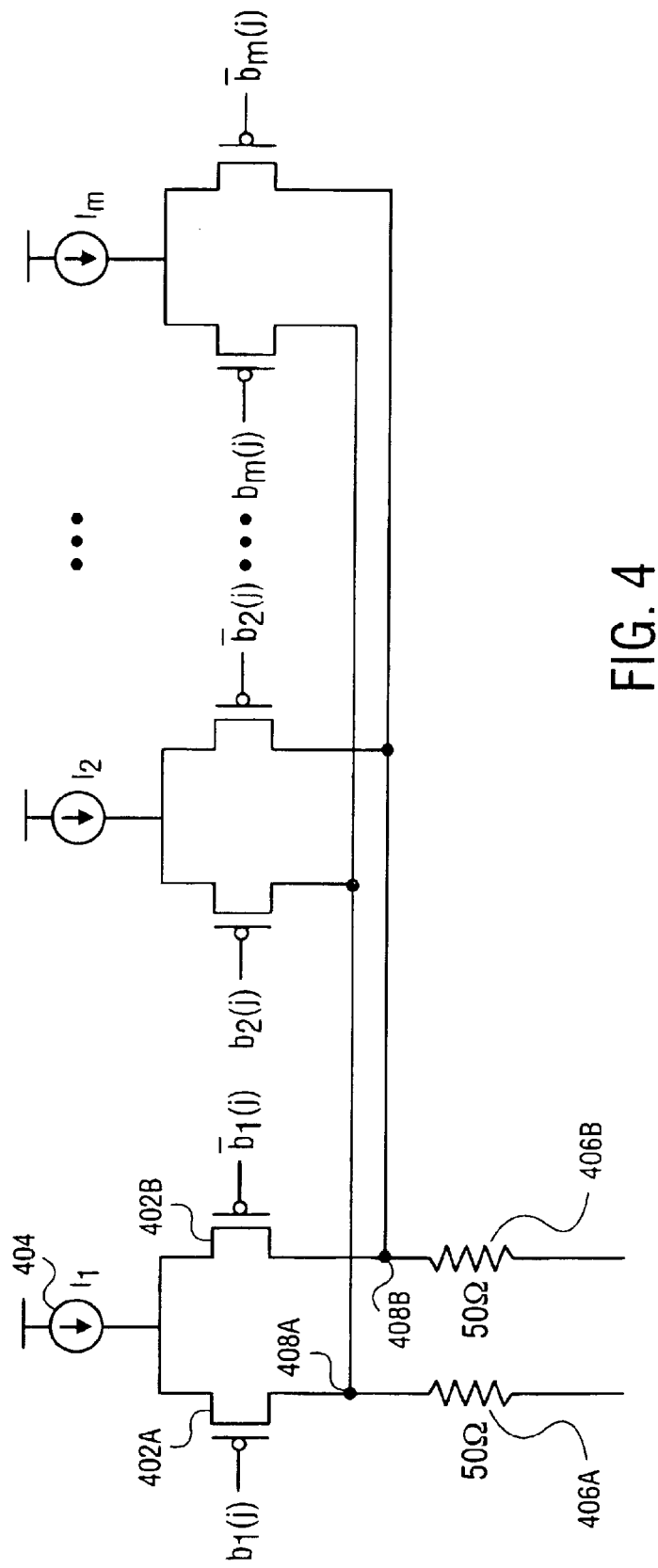
FIG. 4 is an embodiment of a fractionally-spaced, multi-level driver.

The driver of FIG. 4 comprises a plurality of differential pMOSFET pairs, where the gate voltages are derived from the word provided by table 302 to determine the particular signal transmitted by the driver. In FIG. 4, the gate voltages are denoted by $b_i(j)$ and its complex conjugate $\bar{b}_i(j)$, where the index i refers to the differential pair and the index j is a time index. For example, the differential pair comprising pMOSFETs 402A and 402B has, respectively, the gate voltages $b_1(j)$ and its complex conjugate $\bar{b}_1(j)$. In the embodiment of FIG. 4, there are m differential pairs, each differential pair i with a current source to provide bias current $I_i$. For example, the first differential pair comprising pMOSFETs 402A and 402B has current source 404 to provide a bias current $I_i$.

Without loss of generality, the current sources may be chosen such that $I_i<I_{i+1}$. Loads 406A and 406B represent the loading due to transmission lines. That is, nodes 408A and 408B are connected to transmission lines for the case of differential signaling. If single-ended signaling is employed, then only one node, say node 408B, is connected to a transmission line. The range of index j determines the number of discrete values a particular signal assumes over its period, and may be considered the number of fractional time intervals in a period. For example, if j runs from 1 to k, then the signal provided at node 408B, and perhaps node 408A if differential signaling is employed, takes on k discrete values over its period. Letting T denote the period of the transmitted signal, for the fractional period of time $[(j-1)(T/k),j(T/k)]$ where $1 \leq j \leq k$, the gate voltages are $b_i(j)$, i=1, . . . ,m, and also $\bar{b}_i(j)$, i=1, . . . ,m if differential signaling is employed. The word provided by table 302 for the embodiment of FIG. 4 is of dimension mk. The space of possible signals synthesize by the driver of FIG. 4 is determined by the choice of bias currents, the number of differential pairs, the number of fractional intervals of the period, and the particular choice of the gate voltages. These parameters may be chosen to approximate the desired transmit signal, for example, a transmit signal with Fourier transform $H(f)^{-1}D(f)$.

Various modifications may be made to the disclosed embodiments without departing from the scope of the invention as claimed below. For example, for some embodiments, a finite state machine may be employed instead of a look-up table to provide the words provided to the drivers.

What is claimed is:

1. An apparatus to communicate a set of data symbols d(i) where i=1, . . . , n, where n is a positive integer greater than one, the apparatus comprising:

a set of transmission lines l(i) where i=1, . . . , n, where transmission line l(i) propagates a signal x(i) for i=1, . . . , n;

a set of receivers r(i) where i=1, . . . , n, wherein receiver r(i) is connected to transmission line l(i) to receive the signal x(i) for each i=1, . . . , n;

a set of drivers t(i) where i=1, . . . , n, where driver t(i) is connected to transmission line l(i) to transmit the signal x(i) for each i=1, . . . , n; and a mapper to map the set of data symbols d(i) to the signals x(i) for i=1, . . . , n, wherein for each i=1, . . . , n, x(i) is a function of d(i) and at least one d(j) for j≠i;

wherein for each i=1, . . . , n, receiver r(i) provides an estimate of d(i) based upon the signal x(i) independently of x(j) for j≠i.

2. The apparatus as set forth in claim 1, wherein the mapper comprises:

a table, wherein the table stores words addressed by the set of data symbols, wherein for each i=1, . . . , n, the driver t(i) transmits the signal x(i) in response to a word stored in the table.

3. The apparatus as set forth in claim 1, wherein the mapper comprises:

a finite state machine, wherein the finite state machine in response the set of data symbols provides words to the set of drivers, wherein for each i=1, . . . , n driver t(i) transmits the signal x(i) in response to a word.

4. The apparatus as set forth in claim 1, wherein the set of transmission lines is such that transmission line l(i) for an i has capacitive coupling with another transmission line l(j) where j≠i.

5. A computer system comprising:

a set of transmission lines l(i) where i=1, . . . , n, where transmission line l(i) propagates a signal x(i) for i=1, . . . , n; where n is a positive integer greater than one, a first die comprising:

a set of drivers t(i) where i=1, . . . , n, where driver t(i) is connected to transmission line l(i) to transmit the signal x(i) for each i=1, . . . , n;

a mapper to map a set of data symbols d(i) to the signals x(i) for i=1, . . . , n, wherein for each i=1, . . . , n, x(i) is a function of d(i) and at least one d(j) for j≠i; and a second die, the first die connected to the second die by the set of transmission lines, the first die to communicate the set of data symbols d(i) where i=1, . . . , n to the second die, the second die comprising:

a set of receivers r(i) where i=1, . . . , n, wherein receiver r(i) is connected to transmission line l(i) to receive the signal x(i) for each i=1, . . . , n;

wherein for each i=1, . . . , n, receiver r(i) provides an estimate of d(i) based upon the signal x(i) independently of x(j) for j≠i.

6. The apparatus as set forth in claim 5, wherein the mapper comprises:

a table, wherein the table stores words addressed by the set of data symbols, wherein for each i=1, . . . , n driver t(i) transmits the signal x(i) in response to a word stored in the table.

7. The apparatus as set forth in claim 5, wherein the mapper comprises:

a finite state machine, wherein the finite state machine in response the set of data symbols provides words to the set of drivers, wherein for each i=1, . . . , n driver t(i) transmits the signal x(i) in response to a word.

8. The apparatus as set forth in claim 5, wherein the set of transmission lines is such that transmission line l(i) for an i has capacitive coupling with another transmission line l(j) where j≠i.

9. A method to provide crosstalk equalization, the method comprising:

mapping a set of data symbols d(i), i=1, . . . , n to a set of signals x(i), i=1, . . . , n, where n is a positive integer greater than one, wherein for each i=1, ..., n, x(i) is a function of d(i) and at least one d(j) for j≠i;

transmitting the set of signals on a set of transmission lines l(i), i=1, ..., n, where for each i=1, ..., n, x(i) is transmitted on transmission line l(i); and receiving the set of signals by a set of receivers r(i) where i=1, ..., n, wherein for each i=1, ..., n, receiver r(i) estimates the data symbol d(i) based upon the signal x(i) independently of the signals x(j) for j≠i.

* * * * *